Patented June 15, 1943

2,322,072

UNITED STATES PATENT OFFICE 2,322,072

PURIFICATION OF INTERPOLYMERS

Robert M. Thomas, Union, and Irving E. Lightbown, Roselle, N. J., assignors, by mesne assignments, to Jasco, Incorporated, a corporation of Louisiana No Drawing. Application July 1, 1939, Serial No. 282,478

12 Claims. (Cl. 260—79)

This invention relates to the production of polymeric materials having high elasticity, high tensile strength and high abrasion and flexure resistance, and relates particularly to means and methods of increasing the strength and reducing the tendency to form flaws and bubbles in the material by the purification of polymeric materials produced from olefinic and diolefinic materials utilizing a solution and reprecipitation procedure.

Under conditions of low temperature, and in the presence of a suitable Friedel-Crafts type of catalyst, it has been found possible to polymerize mixtures of isoolefinic and diolefinic substances into polymeric substances which have many of the physical properties of rubber, such as a high elasticity; and when suitably cured have a high tensile strength and high abrasion and flexure resistance as well as high chemical resistance to chemical reagents as is shown in the copending application, Serial No. 182,252, filed December 29, 1937, for one of the inventors of the present application, Robert M. Thomas, together with William J. Sparks.

In the preferred form of the embodiment an isoolefin such as isobutylene may be polymerized with small proportions of one or more diolefins such as butadiene, isoprene, cyclopentadiene, dimethyl butadiene, etc., the diolefin being present in relatively small proportions ranging from ½ part with 99½ parts of the isoolefin, to 30 parts with 70 parts of isoolefin, to produce a polymer substance which differs from the polymer produced from an isoolefin alone by the capability of absorbing small proportions of sulfur to produce a material which can be cured by heat, and which when cured is substantially lacking in cold flow, is insoluble in hydrocarbons and has a high tensile strength, as well as the other above-mentioned valuable physical and chemical properties. By proper choice of catalyst such as aluminum chloride or zirconium tetra chloride dissolved in an alkyl halide solvent such as methyl or ethyl chloride and suitable choice of low temperature, ranging from about −50° C. to about −150° C. or even lower, it is possible to produce polymeric material having molecular weights ranging from 20,000 to 200,000 or above, the upper limit being as yet unknown. These high molecular weight polymers may then be mixed with various amounts of sulfur, zinc oxide and a small percentage of a suitable sulfurization catalyst such as approximately 0.25 to 2.5% of Tuads (tetra methyl thiuram disulfide) and thereafter cured by heat to incorporate the sulfur into the polymer at temperatures ranging approximately from 120° C. to 180° C., preferably 150° C., for periods of time ranging from 20 to 160 minutes.

It is found, however, that some batches of the polymeric material develop flaws or bubbles or weak spots within the body of the cured compound which seriously weaken the material and produce a very great decrease in tensile strength, each bubble serving as a focal point for concentration of stresses.

The present invention provides a simple procedure for overcoming the tendency to produce bubbles during the curing operation, and is also concerned with a particular method of accomplishing the same, namely a solution and reprecipitation procedure in a particular type of solvent by which procedure the bubble-producing substances are removed.

Thus an object of the invention is to polymerize a mixture of isoolefinic and diolefinic substances to produce a high molecular weight polymer; thereafter to dissolve the polymer in a solvent, and separate from the solution a desired portion of the dissolved polymer, which is capable of being mixed with sulfur and sulfur compounds and cured by a heat treatment to avoid the development of bubbles and weaknesses therein, and to produce instead a fully homogeneous product.

Other objects and details will be apparent from the following description:

In the operation of the refining of crude oil, it is customary to "top" the crude to remove the natural gasoline, and thereafter to crack the residual crude at high temperature and pressure for the production of additional quantities of gasoline boiling range hydrocarbons. This cracking operation produces also about 15% of gaseous by-product, which consists in part of hydrogen, in part of methane and its homologues, and in part of ethylene and its homologues, including isobutylene, butadiene and similar isoolefinic and diolefinic gases. The isoolefinic materials and the diolefinic materials are then separated from the cracking gases, and utilized for the process of the present invention.

The isoolefin such as isobutylene in the proportion of 70 to 90 parts is desirably mixed with the diolefin such as butadiene in a proportion of 30 to 10 parts; this proportion applying particularly to mixtures of isobutylene and butadiene. A similar mixture may be prepared with 95 to 99 parts of isobutylene and 5 parts to 1 part of isoprene.

These mixtures of olefinic gases are then chilled to temperatures ranging from about −50°

C. to about −150° C. and mixed with a suitable diluent-refrigerant such as liquefied ethylene, or liquefied propane, or other liquid mixtures which may include ethane and methane as well as the gases above mentioned. The mixture is polymerized with a catalyst which desirably consists of aluminum chloride dissolved in ethyl or methyl chloride, but may also consist of zirconium tetra chloride or other active halide compounds dissolved in suitable inert solvents of low freezing point as desired.

The polymerization reaction occurs quickly to yield the desired polymer, the heat of reaction being absorbed by the latent heat of vaporization of the refrigerant-diluent which is desirably recondensed for recycling. It may be observed that in some cases, for example with isobutylene and butadiene, the polymerization preferably does not go to completion, but that a better product is obtained when the reaction product contains not more than 40 to 70% of the mixed olefinic materials. In all cases, the activity of the catalyst is desirably destroyed at an appropriate stage of the polymerization reaction by the addition thereto of a quenching agent such as alcohol or other oxygenated compound.

The resulting polymer is then separated from the reaction mixture and allowed to warm up to room temperature.

Ordinarily, the polymer so produced can be cured with small proportions of sulfur as above described, but shows a troublesome tendency toward the development of bubbles in the mass of the cured material and in addition is lacking in maximum physical strength, abrasion resistance and flexure resistance.

Accordingly, by the added step of the present invention the polymer, as recovered from the polymerization process, is dissolved in a solvent of the type of ethylene dichloride.

Example 1

In this procedure, the polymer material is dissolved in hot ethylene dichloride at a temperature ranging between 60° C. and 100° C., under pressure when the solution temperature is above the boiling point of the ethylene dichloride at atmospheric pressure. It is found that the polymeric material is soluble in the proportion of 95–100% in the solvent at 84° C. temperature. The ethylene dichloride is desirably saturated with polymer at the solution temperature, and the solution is then separated from any undissolved polymer or other residual materials. Upon cooling to a temperature of 75° C., or thereabouts, a portion of the polymer separates. This separation is in some respects analogous to a fractional crystallization, but since the polymer material is wholly non-crystalline and entirely amorphous it is not in fact an actual fractional crystallization. Furthermore, it may be observed that while a fractional crystallization is utilized for the purpose of separating different chemical substances, the polymer broadly is a single chemical substance in which different molecules are of different molecular weights. It is found that the higher molecular weight molecules are less soluble in the ethylene dichloride than are the lower molecular weight molecules and accordingly the first portion of the polymer to separate contains the highest molecular weight polymer molecules. After the solution has cooled to a substantially lower temperature such as 50° C., the first separated portion of the polymer may be removed. Thereafter a further portion may be obtained by further cooling of the ethylene dichloride solution, and successive portions made up of progressively lower molecular weight molecules may be recovered by successive separations at progressively lower temperatures, until temperatures as low as 0° C. are reached. At temperatures as low as this, substantially all of the solid polymeric material is separated. The ethylene dichloride may then be evaporated, and a residue of oily material which is polymer of molecular weight ranging from approximately 500 to 2500 is secured.

It is believed that the oily material which does not separate from the ethyl chloride solution by cooling is the corruptive factor which produces the bubbles and weakness of the polymeric material after curing since relatively minor differences only are found in the physical properties of the several portions of polymer separated at progressively lower temperatures when they have been properly cured with sulfur and sulfur-containing compounds such as Tuads (tetra methyl thiuram disulfide).

Thus the preferred solvent of the invention is ethylene dichloride. Various other similar solvents are, however, similarly usable. These may include other chlorinated hydrocarbons such as trichlorethane, or various oxygenated compounds, such as propyl or butyl ether, etc., and in certain cases aromatic solvents such as benzene or toluene. In other cases mixtures of such solvents with better solvents (e. g. $CHCl_3$ or $CCl_4$) may be employed to give partial solvents for higher weight products.

Alternatively, the polymer materials may be dissolved in a suitable solvent such as a low boiling hydrocarbon, or carbon tetrachloride, and precipitated therefrom by a precipitant such as an oxygen-containing liquid of the type of the alcohols, acetones, ketones, etc., although in general such a precipitation does not produce quite as sharp a separation between the high molecular weights and low molecular weights as does the previous embodiment.

This alternate separation procedure may be conducted as follows:

Example 2

In 10 liters of diisobutylene, 120 grams of copolymer was dissolved, and to this solution was added 10.5 liters of a solvent mixture consisting of 50% by volume of 91% isopropyl alcohol and 50% by volume of diisobutylene. After thorough mixing, 54 grams of a polymer having a molecular weight of 132,500 was precipitated. This precipitate was recovered and dried. The product after compounding with sulfur and fillers and curing contained no blisters, whereas the directly cured product blistered badly.

Thus Example 1 discloses a procedure in which a moderately good solvent for the polymeric material is utilized as a medium in which a considerable proportion of polymeric material may be dissolved at a high temperature and fractionally separated therefrom by successive reductions in temperature. This example is given as a representative one, and the ethylene dichloride may be replaced by one or more of a considerable number of other solvents such as trichlorethane, perchlorethylene and suitable aromatic compounds such as benzene or toluene.

On the other hand, Example 2 presents an embodiment of the invention in which a good solvent for the polymeric material is utilized, the solution made at room temperature, and the solubility of the solute thereafter reduced by the addition of solubility reducing agents. This also is representative of a considerable number of solvents and solvent combinations such as common oxygenated solvents, alcohols, ketones and lower ethers such as isopropyl ether, ethyl ether, etc.

The above representative embodiments utilize good solvents for the polymer, and produce a true solution which can be filtered if desired to remove solid impurities. Since, however, the polymeric material as originally produced is usually substantially free from such insoluble solid impurities, the filtration step is not always necessary.

Accordingly, a third embodiment consists in a chemical extraction of the undesired portions of the polymer without the production of an actual solution of all of the material. This embodiment is particularly advantageous with ultra-high molecular weight material such as material having an average molecular weight as produced in excess of 100,000 to 200,000. Such material contains a large proportion of very high molecular weight polymer which dissolves in any solvent only with considerable difficulty. However, by choice of an appropriate solvent it may be swelled and the lower molecular weight materials dissolved and extracted.

*Example 3*

For this purpose the polymer material may be treated with benzene as a solvent. In this solvent the material swells and goes into a partial solution, the very high molecular weight material being relatively insoluble, and only the low molecular weight material being soluble to any substantial extent in the benzene. The polymer material may be treated with the benzene, and allowed to digest either at room temperature, or at elevated temperature, for a period of time ranging from 2 or 3 hours to several days. At the end of the digestion period, the soluble portion may be strained away from the insoluble portion. The insoluble portion then may be dried to volatilize traces of the solvent which may have entered the insoluble polymeric material. Polymeric material of sufficiently high average molecular weight to require this type of treatment usually contains so little of the interfering substances that it will cure satisfactorily after a single extraction treatment. If, however, a satisfactory cure is not obtained after a single extraction treatment, the treatment may be repeated one or more additional times, using fresh solvent in each instance. Repeated extraction will in most instances remove substantially all of the interfering material and produce a polymeric product which is capable of curing to a high tensile strength with entire freedom from flaws, bubbles and other strength-reducing defects.

The extraction may be accomplished at an elevated temperature, and if a moderate solvent of the type of ethylene dichloride is used, the very highest molecular weight portions of material may remain undissolved even at the elevated temperature. After the separation of the hot extractive solvent, cooling of the solvent will yield a substantial quantity of intermediate molecular weight material as in the embodiment of Example 1; the thereafter addition of a precipitant such as a mixture of isopropyl alcohol and diisobutylene will yield a quantity of still lower molecular weight polymer; and the evaporation of the solvent and precipitant will result in the recovery of still lower molecular weight, oily portions of polymer.

By the process of the invention there is thus produced a new and useful pure polymer material which can be cured with sulfur without the production of flaws or bubbles or blisters in the body of the material, and which has the new and outstandingly useful characteristics of high tensile strength, high elasticity, high resistance to flexure, high resistance to abrasion and high resistance to chemical substances generally.

While there are above disclosed but a limited number of embodiments of this invention, it is possible to produce still other embodiments without departing from the inventive concepts herein disclosed and it is therefore desired that only such limitations be imposed on the appended claims as are stated therein or required by the prior art.

The invention claimed is:

1. A sulfurizable material comprising an interpolymer of isobutylene and a conjugated diolefin having a molecular weight above 15,000 said interpolymer being free from fluid interpolymers of a molecular weight below about 2,500 which give rise to blister formation on curing by heating said interpolymer with sulfur.

2. A sulfurizable, polymeric material comprising a solid, plastic, substantially saturated, linear chain, high molecular weight interpolymer of an isoolefin with a conjugated diolefin which is substantially free from fluid, polymeric materials of a molecular weight below about 2,500.

3. In the processing of solid, plastic copolymerizates obtained by the polymerization of an isoolefin with a conjugated diolefin in contact with a solution of a Friedel-Crafts type catalyst at a temperature between −50° C. and −150° C., the steps of segregating the copolymers into fractions and separating the fractions of molecular weight below about 2,500 from the fractions of higher molecular weight whereby the latter are rendered capable of yielding on curing products of high elasticity, high tensile strength, high abrasion and flexure resistance substantially free from flaws, bubbles and blisters.

4. In the processing of solid, plastic copolymerizates obtained by the polymerization of an isoolefin with a conjugated diolefin in contact with a solution of a Friedel-Crafts type catalyst at a temperature between −50° C. and −150° C., the steps of segregating the copolymers into fractions, separating the fractions of molecular weight below about 2,500 from the fractions of higher molecular weight, compounding the latter with sulfur and sulfur compounds and curing the material with the aid of heat to a strong, blister-free condition.

5. In the processing of solid, plastic copolymerizates obtained by the polymerization of an isoolefin with a conjugated diolefin in contact with a solution of a Friedel-Crafts type catalyst at a temperature between −50° and −150° C., the steps of dissolving a substantial portion of said copolymer and separating the more difficultly soluble copolymers having a molecular weight above 2,500 from the resultant solution.

6. In the processing of solid, plastic copolymerizates obtained by the polymerization of an isoolefin with a conjugated diolefin in contact with a solution of a Friedel-Crafts type catalyst at temperatures between −50° and −150° C. to produce a solid, plastic interpolymer of the isoolefin and conjugated diolefin, the step of dissolving a substantial portion of the copolymer, separating the more difficultly soluble copolymers having a molecular weight above 2,500 from the resultant solution, compounding the said difficultly soluble copolymers with sulfur and sulfur compounds and curing the material with the aid of heat to a strong, blister-free condition.

7. In the processing of solid, plastic copolymerizates obtained by the polymerization of an isoolefin with a conjugated diolefin in contact with a solution of a Friedel-Crafts type catalyst at a temperature between —50° and —150° C., the steps of dissolving a substantial portion of said copolymerizate in a heated aliphatic compound capable of dissolving high molecular weight hydrocarbons and separating the more difficultly soluble copolymers from the resultant solution by cooling, thereby obtaining the higher molecular weight copolymerizates free from polymeric substances having a molecular weight below 2,500 which interfere with the curing of the copolymerizates.

8. In the processing of solid, plastic copolymerizates obtained by the polymerization of an isoolefin with a conjugated diolefin in contact with a solution of a Friedel-Crafts type catalyst at a temperature between —50 and —150° C., the steps of dissolving a substantial portion of said copolymerizate in a heated aliphatic compound capable of dissolving high molecular weight hydrocarbons and separating the more difficultly soluble copolymers from the resultant solution into several fractions by cooling in successive stages, thereby obtaining the higher molecular weight copolymerizates free from polymeric substances having a molecular weight below 2,500 which interfere with the curing of the copolymerizates.

9. In the processing of solid, plastic copolymerizates obtained by the polymerization of an isoolefin with a conjugated diolefin in contact with a solution of a Friedel-Crafts type catalyst at a temperature between —50 and —150° C., the steps of dissolving a substantial portion of said copolymerizate in heated ethylene dichloride and separating the more difficultly soluble copolymers from the resultant solution into several fractions by cooling in successive stages, thereby obtaining a higher molecular weight copolymerizate free from polymeric substances having a molecular weight below 2,500 which interfere with the curing of the copolymerizate.

10. In the processing of solid, plastic copolymerizates obtained by the polymerization of an isoolefin with a conjugated diolefin in contact with a solution of a Friedel-Crafts type catalyst at a temperature between —50 and —150° C., the steps of dissolving the polymers in an aliphatic compound capable of dissolving high molecular weight hydrocarbons adding thereto a non-solvent for the copolymers in relatively small quantities sufficient to precipitate a part only of the polymeric material and separating the precipitated part from the solution, thereby obtaining a copolymerizate free from polymeric substances having a molecular weight below 2,500 and capable of yielding on curing with sulfur products of high elasticity, high tensile strength, high abrasion resistance and high flexure resistance substantially free from flaws, bubbles and blisters.

11. In the processing of solid, plastic copolymerizates obtained by the polymerization of an isoolefin with a conjugated diolefin in contact with a solution of a Friedel-Crafts type catalyst at a temperature between —50 and —150° C., the steps of treating the polymerized material with an extractive aromatic solvent in which a portion only of the polymer is soluble, separating the solvent and soluble portion from the insoluble portion, thereby rendering the latter substantially free from fluid polymeric substances having a molecular weight below 2,500 and capable of yielding on curing with sulfur products of high elasticity, high tensile strength, high abrasion resistance, and high flexure resistance substantially free from flaws, bubbles and blisters.

12. In the processing of solid, plastic copolymerizates obtained by the polymerization of an isoolefin with a conjugated diolefin in contact with a solution of a Friedel-Crafts type catalyst at a temperature between —50 and —150° C., the steps of treating the polymerized material with benzene in sufficient amount to dissolve a part only of the polymerizate, separating the benzene and the soluble product contained therein from the undissolved copolymer thereby rendering the latter substantially free from fluid polymeric substances having a molecular weight below 2,500 and capable of yielding on curing with sulfur products of high elasticity, high tensile strength, high abrasion resistance and high flexure resistance substantially free from flaws, bubbles and blisters.

ROBERT M. THOMAS.
IRVING E. LIGHTBOWN.